(12) United States Patent
Lu et al.

(10) Patent No.: US 8,583,833 B2
(45) Date of Patent: *Nov. 12, 2013

(54) RING TOPOLOGY DISCOVERY

(75) Inventors: Zihong Lu, Cupertino, CA (US);
Richard A. Meier, Campbell, CA (US);
Sunil P. Shah, San Jose, CA (US); Raj Nagarajan, Newark, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 678 days.

This patent is subject to a terminal disclaimer.

(21) Appl. No.: 12/830,052

(22) Filed: Jul. 2, 2010

(65) Prior Publication Data

US 2010/0265829 A1   Oct. 21, 2010

Related U.S. Application Data (63) Continuation of application No. 11/731,134, filed on Mar. 30, 2007, now Pat. No. 7,752,338.

(51) Int. Cl.
*G06F 15/16* (2006.01)

(52) U.S. Cl.
USPC ............................ 709/251; 709/220; 709/223

(58) Field of Classification Search
USPC .......................................... 709/220, 223, 251
See application file for complete search history.

(56) References Cited

U.S. PATENT DOCUMENTS

| | | | |
|---|---|---|---|
| 5,485,578 A | 1/1996 | Sweazey | |
| 6,766,482 B1 | 7/2004 | Yip et al. | |
| 6,928,050 B2 | 8/2005 | Lynch et al. | |
| 7,003,705 B1 | 2/2006 | Yip et al. | |
| 7,181,547 B1 | 2/2007 | Millet | |
| 7,197,008 B1 | 3/2007 | Shabtay et al. | |
| 7,324,440 B2 * | 1/2008 | Takagi et al. | 370/222 |
| 7,339,887 B2 | 3/2008 | Griswold et al. | |
| 7,450,525 B2 | 11/2008 | Son et al. | |
| 7,500,016 B2 | 3/2009 | Kao et al. | |
| 2004/0221041 A1 * | 11/2004 | Tabbara | 709/227 |
| 2006/0224659 A1 | 10/2006 | Yu | |
| 2007/0094410 A1 | 4/2007 | Voigt et al. | |
| 2007/0280251 A1 | 12/2007 | Wang et al. | |
| 2008/0279203 A1 | 11/2008 | Dos Santos et al. | |
| 2008/0316917 A1 * | 12/2008 | Farkas et al. | 370/221 |
| 2009/0245141 A1 * | 10/2009 | dos Santos | 370/255 |
| 2009/0296569 A1 * | 12/2009 | Ramalho Ribeiro Dos Santos et al. | 370/222 |

OTHER PUBLICATIONS

Non-Final Office Action for U.S. Appl. No. 11/731,134 Mailed Oct. 1, 2009, 11 Pages.

Notice of Allowance and Fees for U.S. Appl. No. 11/731,134 Mailed Feb. 23, 2010, 6 Pages.

* cited by examiner

*Primary Examiner* — Phuoc Nguyen (74) *Attorney, Agent, or Firm* — Blakely, Sokoloff, Taylor & Zafman (57) ABSTRACT

A method is provided for determining the integrity of a domain defined in a network. The method includes processes and systems to facilitate the discovery a conceptual ring topology of the domain in the network, and the determination of the integrity of the domain based on the conceptual ring topology that was discovered.

18 Claims, 5 Drawing Sheets

RING TOPOLOGY DISCOVERY

CROSS-REFERENCE TO RELATED APPLICATIONS

This application is a continuation of and claims priority to U.S. patent application Ser. No. 11/731,134, filed on Mar. 30, 2007 (now U.S. Pat. No. 7,752,338 issued Jul. 6, 2010), entitled "Ring Topology Discovery."

TECHNICAL FIELD

The present invention relates to the field of network communications. In particular, the present invention relates to network management in networks having redundant segments and loops so that there is more than one route to each node.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2007-2010, Extreme Networks, Inc., All Rights Reserved.

BACKGROUND

Many Metropolitan Area Networks (MANs) and some Local Area Networks (LANs) have a ring topology, such as a bridged, layer-2 network like the Ethernet. A problem with bus and ring networks like the Ethernet is the possibility of a single point of failure causing the system to breakdown. A common solution is to design the network with redundant segments and loops so that there is more than one route to each node in an approach that is similar to that employed in a Synchronous Optical NETwork (SONET), a layer-1 technology that was developed in the mid-1980s for the public telephone network and adopted by the American National Standards Institute (ANSI) as a standard for fiber optic networks. Redundancy and loops can, however, present another problem in which a broadcast packet or an unknown unicast packet results in a broadcast storm where each node receives and rebroadcasts the packet causing potentially severe network congestion.

One way of preventing broadcast storms and other unwanted side effects of looping is to use the Spanning Tree Protocol (STP), which has been standardized in the 802.1D specification by the Institute of Electrical and Electronic Engineers (IEEE Std. 802.1D-1998, IEEE Standard for Information technology—Telecommunications and information exchange between systems—Local and metropolitan area networks—Common specifications). With STP, the bridges in the network dynamically calculate an optimum subset of the topology that is loop-free and allows a path to each node. Alternate paths are blocked and unblocked as necessary to keep the routes of communication open when a fault occurs.

Another way of preventing broadcast storms and other unwanted side effects of looping is to use the Ethernet Automatic Protection Switching (EAPS) protocol, described in an informational Request For Comment (RFC) 3619 in October of 2003 as well as in U.S. Pat. Nos. 6,766,482 and 7,003,705, assigned to Extreme Networks, Inc., of Santa Clara, Calif., the assignee of the present application. Among other advantages, EAPS offers improved recovery times over STP, and provides LANS and MANS having a ring topology with resilience comparable to that provided by SONET rings at lower cost and with fewer constraints.

Regardless of whether STP or EAPS is used to prevent loops in a layer-2 network having a ring topology, it is sometimes difficult to insure that they are deployed correctly. For example, among other uses, the EAPS protocol is used to define a protection domain, referred to as an EAPS domain, using a control Virtual Local Area Network (control VLAN) on a single Ethernet ring. Because the configuration of a network in which EAPS is deployed may change, the integrity of an EAPS domain may be broken. It is also possible that the EAPS domain may not have been correctly defined. From a network management point of view, it may be necessary to periodically review EAPS domains to insure their proper operation.

SUMMARY

A method is provided for determining the integrity of a domain defined in a network. The method includes discovering a conceptual ring topology of the domain in the network, and determining the integrity of the domain based on the conceptual ring topology.

According to one aspect of the invention, the method determines which devices in a network are within a particular domain. The particular domain may include a protection domain in a ring network having multiple routes to a given destination, where the devices within the protection domain are devices in which a protocol to prevent traffic from looping in the network has been enabled.

According to one aspect of the invention, the devices within the protection domain are devices in which the Ethernet Automatic Protection Switching (EAPS) protocol has been enabled, or in which the Spanning Tree Protocol (STP) has been enabled.

According to one aspect of the invention, the method further identifies which ports on the devices are configured to participate in the domain. The ports that are configured to participate in the domain may include, among others, ports that have been added to the same control VLAN with the same control VLAN tag, or the same carrier VLAN with the same carrier VLAN tag, where there are two such ports on the device.

According to one aspect of the invention, the method determines whether a topology of the links discovered from an arbitrary one of the ports configured to participate in the domain form a conceptual ring. The topology of the discovered links forms a conceptual ring when each of the ports configured to participate in the domain are accounted for in the discovered links.

According to one aspect of the invention, discovering the topology of the links from an arbitrary one of the ports configured to participate in the domain includes selecting an arbitrary one of the ports configured to participate in the domain as a starting port, and traversing the link beginning with the starting port to an ending port. If the ending port is also one of the ports configured to participate in the domain, then the method continues traversing the next link using the second port of the device on which the ending port resides as an intermediate port from which to traverse the next link, and repeats this process until reaching an ending port that is either not configured to participate in the domain, or that is the second port configured to participate in the domain on the same device on which the arbitrarily selected starting port resides.

According to one aspect of the invention, reaching an ending port that is not configured to participate in the domain indicates that the ring topology underlying the domain is incomplete, and therefore not functioning properly, referred to herein as a non-functioning ring. A non-functioning ring is typically an indication of a mis-configured domain or broken ring. In some cases, a notification may be generated to alert a network administrator, for example, that the conceptual ring topology associated with the domain is not functioning.

According to one aspect of the invention, reaching an ending port that is the second port configured to participate in the domain on the same device on which the arbitrarily selected starting port resides indicates that the ring topology underlying the domain is complete, and therefore capable of functioning properly, referred to herein as a functioning ring. A functioning ring is typically an indication of a well-configured domain. In the context of an EAPS protocol, for example, a functioning ring is an indication of a well-configured domain when the discovered links comprising the ring include two ports of a single device designated as the primary and secondary ports of a master node of a protection domain, and two ports of each of the remaining devices designated as the respective two ring ports of a transit node of the protection domain. In some cases, a notification may be generated to alert a network administrator, for example, that the conceptual ring topology associated with the domain is functioning or that the domain is a well-configured domain.

According to one aspect of the invention, the ports configured to participate in a domain may be compiled into a list to facilitate determining whether each of the ports have been accounted for in the discovered links.

According to one aspect of the invention, the links are discovered using a link discovery protocol. Among other protocols, the link discovery protocols may include the Link Layer Discovery Protocol and the Extreme Discovery Protocol.

In accordance with these and other aspects of the present invention, a system and apparatus are provided for carrying out the above and other methods.

BRIEF DESCRIPTION OF THE DRAWINGS

The present invention is illustrated by way of example, and not necessarily by way of limitation, in the figures of the accompanying drawings in which like reference numerals refer to similar elements, and in which.

DETAILED DESCRIPTION OF THE INVENTION

In the following description, various aspects of the present invention will be described. However, it will be understood by those skilled in the art that the present invention may be practiced with only some or all aspects of the present invention. For purposes of explanation, specific numbers, materials and configurations are set forth in order to provide a thorough understanding of the present invention. However, it will also be apparent to those skilled in the art that the present invention may be practiced without these specific details.

Parts of the description will be presented in terms of operations performed by a computer system, using terms such as data, state, link, fault, packet, and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, routers, bridges, switches, and the like, that are standalone, adjunct or embedded.

Additionally, various operations will be described as multiple discrete steps in turn in a manner that is helpful in understanding the present invention. However, the order of description should not be construed as to imply that these operations are necessarily order dependent, in particular, the order of their presentation.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention provides a method and apparatus for discovering a conceptual ring topology of a domain in a network. The conceptual ring topology is the virtual, or logical, topology underlying the domain, and includes any topology having a ring shape. For instance, one domain having a ring-shaped conceptual topology is a protection domain for preventing looping in a ring network, where the ring network is typically a bridged, layer-2 network designed so that there is more than one route to each node in the network.

In one embodiment, a protection domain may be implemented using a control VLAN to exchange control messages within the protection domain. In another embodiment, the protection domain may be implemented using a carrier VLAN to exchange the control messages. In either embodiment, the protection domain is used to protect traffic traveling over one or more data VLANs from looping within the protection domain, i.e., to prevent traffic from being unnecessarily broadcast or otherwise unnecessarily transmitted within the protection domain. In one embodiment, the protection domain is an Ethernet Automatic Protection Switching (EAPS) domain, so named because it is implemented using the EAPS protocol. In another embodiment, the protection domain is a Spanning Tree Protocol domain, so named because it is implemented using STP.

A protection domain defined using the EAPS protocol has a single designated "master node;" all other nodes in the EAPS domain are referred to as "transit nodes." Each node in the EAPS domain has two ports connected to the underlying EAPS ring. One port of the master node is designated as a "primary port" of the EAPS domain, while the other port is designated as a "secondary port." The transit nodes' two ports are also designated as a "primary port" and "secondary port" of the EAPS domain, but are commonly referred to simply as "ring ports." The EAPS domain protects a data VLAN's traffic against looping when the data VLAN is configured on all ports of the EAPS domain, referred to as a protected data VLAN.

An EAPS domain operates in conjunction with the master node to detect a network failure by means of control messages sent between the nodes of the EAPS domain using the control VLAN. During normal operation, the master node blocks the protected data VLAN's traffic from traversing its secondary port. During a network failure, the master node reroutes the protected data VLAN's traffic through its secondary port. When the network is restored, the EAPS domain operates in conjunction with the affected transit node to prevent looping by blocking the protected data VLAN's traffic from traversing its restored ring port until notified by the master node that normal operation has resumed.

Since the EAPS protocol depends on the use of control VLAN tags to pass the EAPS control messages amongst the nodes in the control VLAN that defines the EAPS domain, it is theoretically possible to use the control VLAN tag to determine the conceptual ring topology of EAPS domains by simply identifying those devices in which EAPS is enabled and which have the same control VLAN tag. But in large networks, a particular VLAN tag may be used in different parts of the subnet, and cannot be relied on to determine whether a node in which the control VLAN tag is present forms part of the conceptual ring topology of an EAPS domain. Therefore, other ways of discovering the conceptual ring topology of EAPS domains must be employed to ensure their integrity and accuracy.

Although the embodiments of the invention are primarily described in the context of their application to protection domains such as EAPS domains, it should be understood that the methods and apparatus described below for discovering a conceptual ring topology may be applied to other types of domains without departing from the scope of the claims that follow, as long as the underlying topology of the domain forms a ring shape. For example, the described embodiments for discovering a conceptual ring topology of a domain may be applied to protection domains defined with STP without departing from the scope of the claims that follow.

Figure 1:
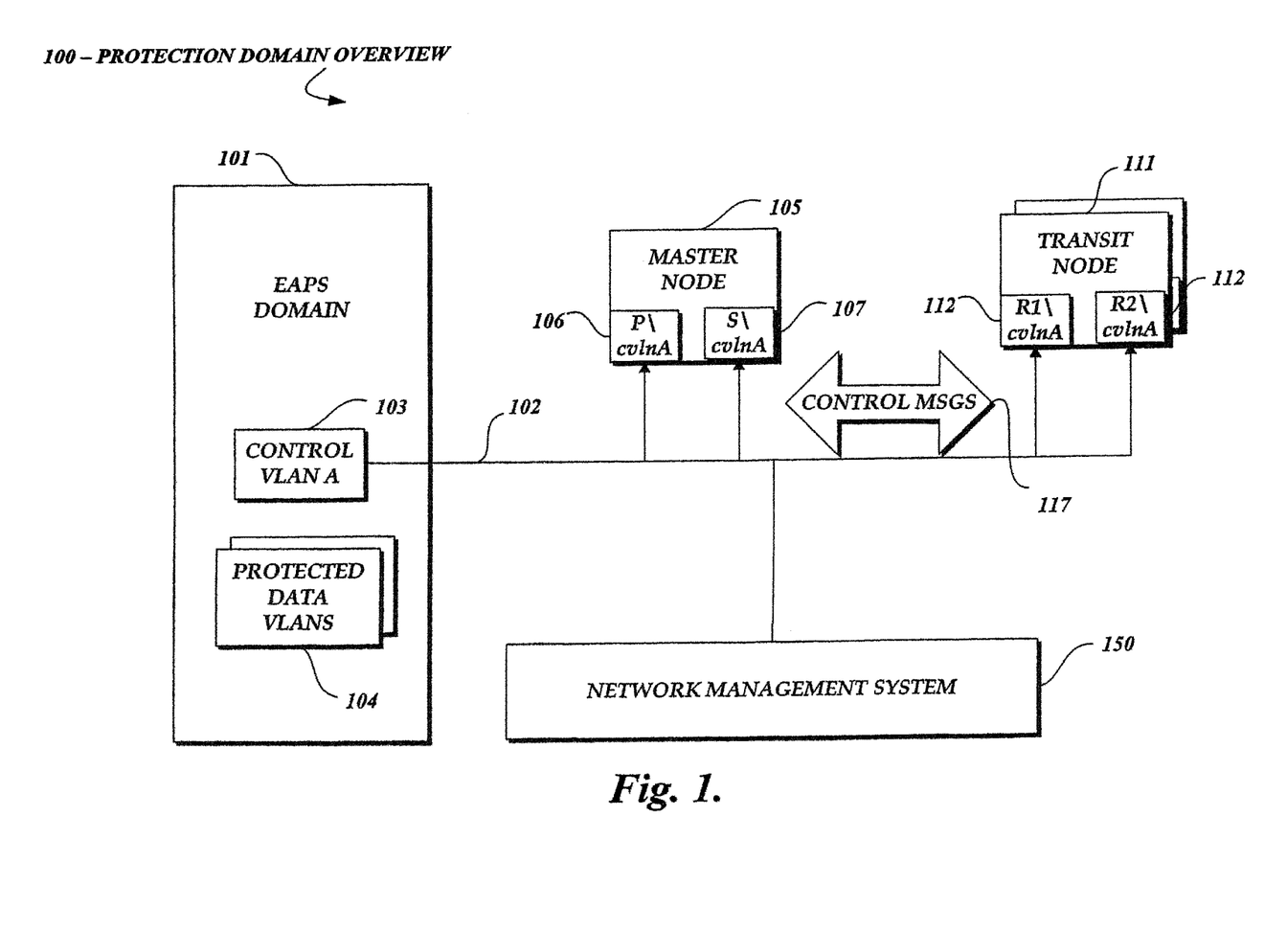
FIG. 1 is a block diagram illustrating an overview of a protection domain in which certain aspects of the illustrated invention may be practiced.

FIG. 1 is a block diagram illustrating an overview of a protection domain in which certain aspects of the illustrated invention may be practiced. In the illustrated example, a protection domain may comprise an EAPS domain 101. A control VLAN 103, such as control VLAN A, is created for each EAPS domain 101 for the purpose of sending and receiving EAPS control messages 117. Each EAPS domain 101 is created to protect a group of one or more data carrying VLANs, referred to as protected data VLANs 104.

The EAPS domain 101 operates on a ring network 102. One node on the ring network 102 is designated as the master node 105. The two ports on the master node 105 are designated as primary port 106 and secondary port 107. All other nodes on the ring network 102 are transit nodes 111 and each transit node has two ring ports 112. All of the ports participating in the protection domain, 106 107, and 112 R1 and 112 R2 are added to the control VLAN used in the domain, in this case "cvlnA." During operation of the protection domain, the master node 105 and the transit nodes 111 use control messages 117 to communicate via the control VLAN 103, in this case control VLAN A. A detailed description of the operation of an EAPS domain 101 may be found in U.S. Pat. Nos. 6,766,482 and 7,003,705, assigned to Extreme Networks, Inc., of Santa Clara, Calif., the assignee of the present application.

In a typical embodiment, a request to discover a conceptual ring topology is initiated via a network management system 150, usually by a network administrator or other individual responsible for maintaining the protection domains 101. In response to the request, the NMS 150 initiates logic to discover the conceptual ring topologies of the protection domains currently established on the network 102, as will be described in further detail below.

Figure 2:
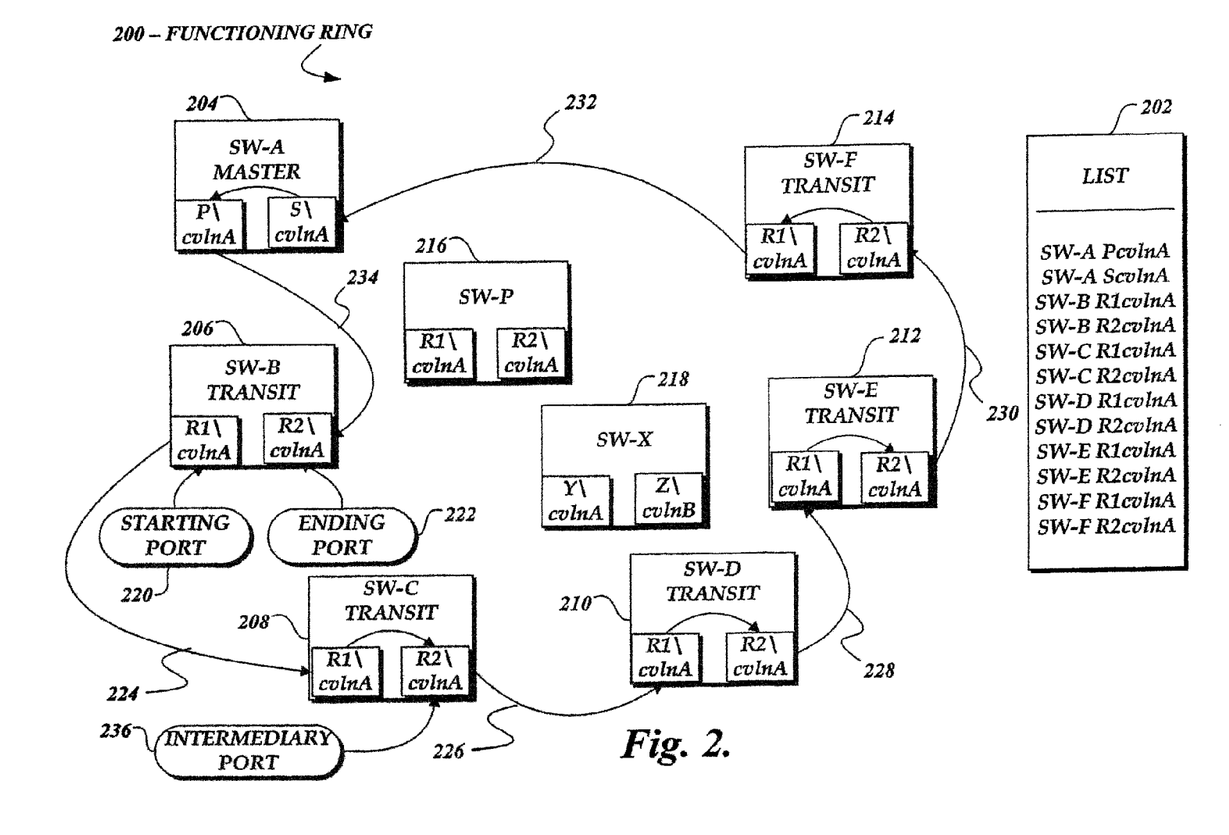
FIG. 2 is an illustration of a functioning conceptual ring topology, and in which certain aspects of the illustrated invention may be practiced.

FIG. 2 is an illustration of a functioning conceptual ring topology, and in which certain aspects of the illustrated invention may be practiced. As noted with reference to FIG. 1, in response to a request to discover a conceptual ring topology, the NMS 150 initiates logic in a discovery process to discover a conceptual ring topology, such as the functioning ring topology illustrated in FIG. 2. The NMS discovery process first identifies those network devices in which protection domains have been enabled, in this case the devices on the network 102 in which the EAPS protocol to prevent looping has been enabled. In the illustrated embodiment, the devices in which the EAPS protocol has been enabled include SW-A, 204, a device in which there appears to be configured a master node of an EAPS domain using a control VLAN name "cvlnA," and having a primary P and secondary S port, each having been added to the control VLAN named "cvlnA," as well as SW-B, 206, SW-C, 208, SW-D, 210, SW-E, 212, and SW-F, 214, devices in which there appear to be configured transit nodes of an EAPS domain using the control VLAN name "cvlnA," each having two ring ports, R1 and R2, also added to the control VLAN named "cvlnA." All of the switches SW-A through SW-F have ports that are compiled in the list 202 since they each have two ports added to the same control VLAN named "cvlnA," with the same control VLAN tag, and are, therefore, possibly part of the conceptual ring topology comprising an EAPS protection domain, the discovery of which has been requested.

As illustrated in the example, there are typically numerous other devices present in the network, such as SW-P, 216, and SW-X, 218, having one or more ports added to the same control VLAN named "cvlnA." It is not uncommon, for example, for the same control VLAN name to be used in different parts of a subnet for separate control VLANs that are not part of an EAPS protection domain. However, if the EAPS protocol is not enabled on those devices, or if the device does not also have two ports added to the same control VLAN name with the same control VLAN tag, the NMS will not include them when compiling the list 202. Thus, for example, ports R1 and R2 on SW-P 216 are not included in the list 202 because the EAPS protocol is not enabled on SW-P. As another example, ports Y and Z on SW-X 218 are not included in the list 202 because the Y and Z ports have been added to different control VLANs, named cvlnA and cvlnB, respectively; therefore SW-X 218 does not have the requisite two ports added to the same control VLAN with the same control VLAN tag.

In a typical embodiment, after compiling the list, the NMS discovery process proceeds to choose an arbitrary starting port from which to discover the conceptual ring topology, by choosing any one of the ports that appear to be configured to participate in the domain as compiled in the list 202. In the illustrated example, the arbitrary starting port 220 is the first ring port, R1, of SW-B 206, one of the transit nodes in the list 202. From there, the NMS discovery process employs a link discovery protocol, such as the Link Layer Discovery Protocol (LLDP) to traverse the link 224 to the next port, in this case the first ring port, R1, on SW-C 208. The NMS discovery process compares this port to those appearing in the list 202, and finding that it is present in the list, continues the discovery process, this time starting with the second ring port, R2, on the current device, SW-C 208, referred to as the intermediary port 236. As before, the NMS discovery process traverses link 226 to the next port, in this case the first ring port, R1, on SW-D 210. Again, the NMS discovery process compares this port to those appearing in the list 202, and finding that it is present in the list, continues the discovery process, this time starting with the second ring port, R2, on the current device, SW-D 210, and so forth, until it reaches device SW-A 204, where it traverses the final link 234 from the primary port of SW-A 204 to the second ring port, R2, of SW-B 206, referred to as the ending port 222. Reaching the ending port 222, the NMS discovery process compares the ending port 222 to confirm not only that it is present in the list 202, but also whether it matches the other of the two ring ports on the device SW-B 206 where the discovery process began. In this case, the ending port 222, the second ring port, R2, of SW-B 206, is present in the list 202, and also matches the second of the two ring ports, R1 and R2, on the device SW-B 206 where the discovery process began. Having successfully confirmed the ending port 222, the NMS discovery process can now respond to the request to discover the conceptual ring topology and notify the requester that a functioning conceptual ring topology has been discovered.

Figure 3:
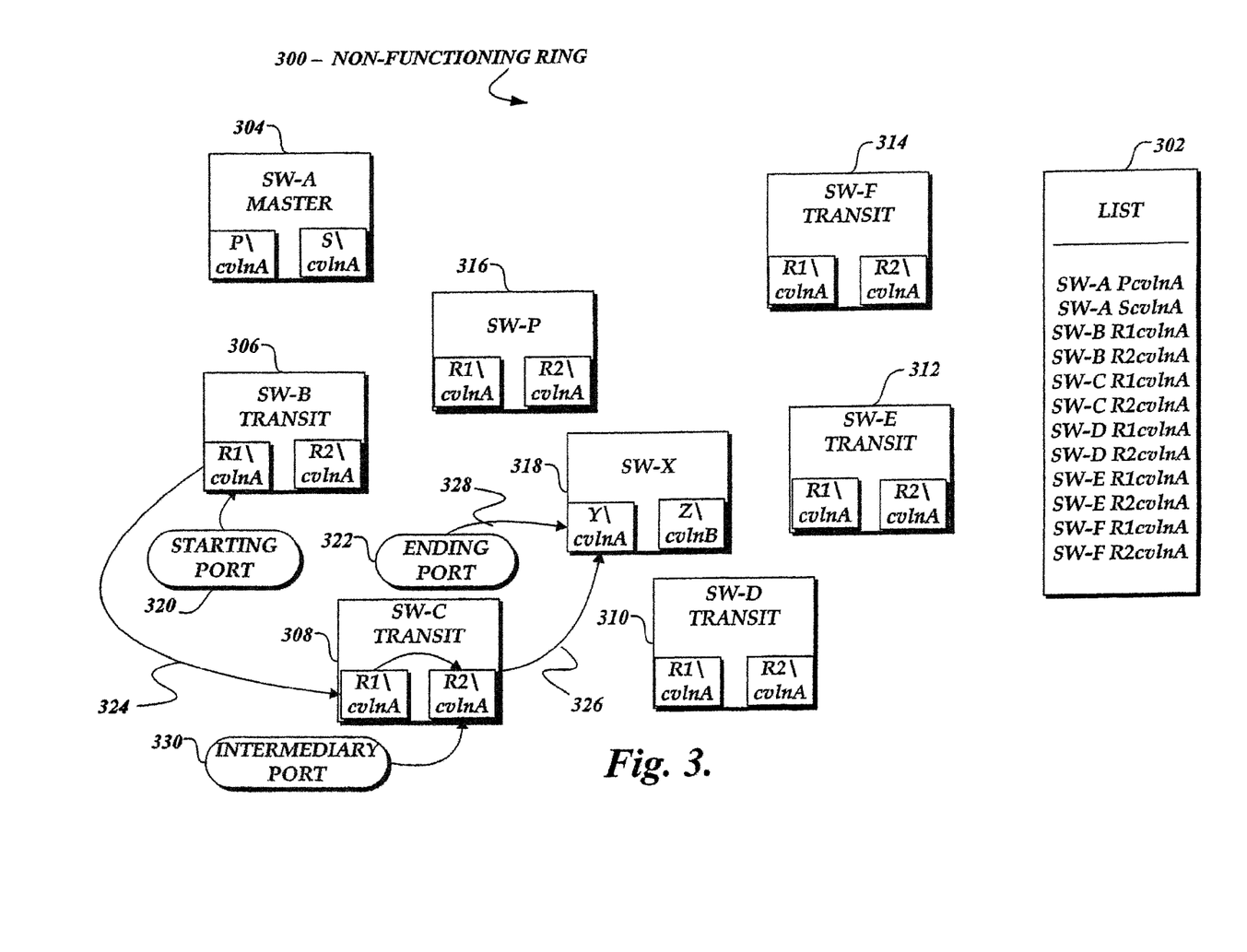
FIG. 3 is an illustration of a non-functioning conceptual ring topology, and in which certain aspects of the illustrated invention may be practiced.

FIG. 3 is an illustration of a non-functioning conceptual ring topology, and in which certain aspects of the illustrated invention may be practiced. As noted with reference to FIG. 1, in response to a request to discover a conceptual ring topology, the NMS 150 initiates a discovery process logic to discover a conceptual ring topology, such as the non-functioning topology illustrated in FIG. 3. As in FIG. 2, in response to the request, the NMS discovery process first identifies those network devices connected to the network 102 in which protection domains have been enabled, in this case the devices on the network 102 in which the EAPS protocol to prevent looping has been enabled. As in the previous example in FIG. 2, the devices in FIG. 3 in which the EAPS protocol has been enabled include SW-A, 304, a device on the network on which there appears to be configured a master node of an EAPS domain using a control VLAN name "cvlnA," and having a primary P and secondary S port, each having been added to the control VLAN named "cvlnA," with the same control VLAN tag, as well as SW-B, 306, SW-C, 308, SW-D, 310, SW-E, 312, and SW-F, 314, devices on which there appear to be configured transit nodes of an EAPS domain using the control VLAN name "cvlnA," having two ring ports, R1 and R2, also added to the same control VLAN named "cvlnA," with the same control VLAN tag. Each of the switches SW-A through SW-F have ports that are compiled into the list 302 since they each have two ports added to the same control VLAN named "cvlnA," with the same control VLAN tag, and are, therefore, possibly part of the ring topology comprising an EAPS protection domain, the discovery of which has been requested.

As in FIG. 2, in a typical embodiment, after compiling the list, the NMS discovery process proceeds to choose an arbitrary starting port from which to discover the conceptual ring topology illustrated in FIG. 3, by choosing any one of the ports that appear to be configured to participate in the domain as compiled in the list 302. In the illustrated example, the arbitrary starting port 320 is the first ring port, R1, of SW-B 306, one of the transit nodes in the list 302. From there, the NMS discovery process employs the link discovery protocol, such as the LLDP to traverse the link 324 to the next port, in this case the first ring port, R1, on SW-C 308. The NMS discovery process compares this port to those appearing in the list 302, and finding that it is present in the list, continues the discovery process, this time starting with the second ring port, R2, on the current device, SW-C 308 referred to as the intermediary port 330. This time, the NMS discovery process traverses link 326 to the next port, in this case a port, Y, on SW-X 318. When the NMS discovery process compares port Y to those appearing in the list 302, it finds that port Y is, in fact, not present in the list. This finding terminates the discovery process at ending port 322, after which the NMS discovery process responds to the request to discover the conceptual ring topology and notifies the requester that a non-functioning conceptual ring topology has been discovered.

Figure 4:
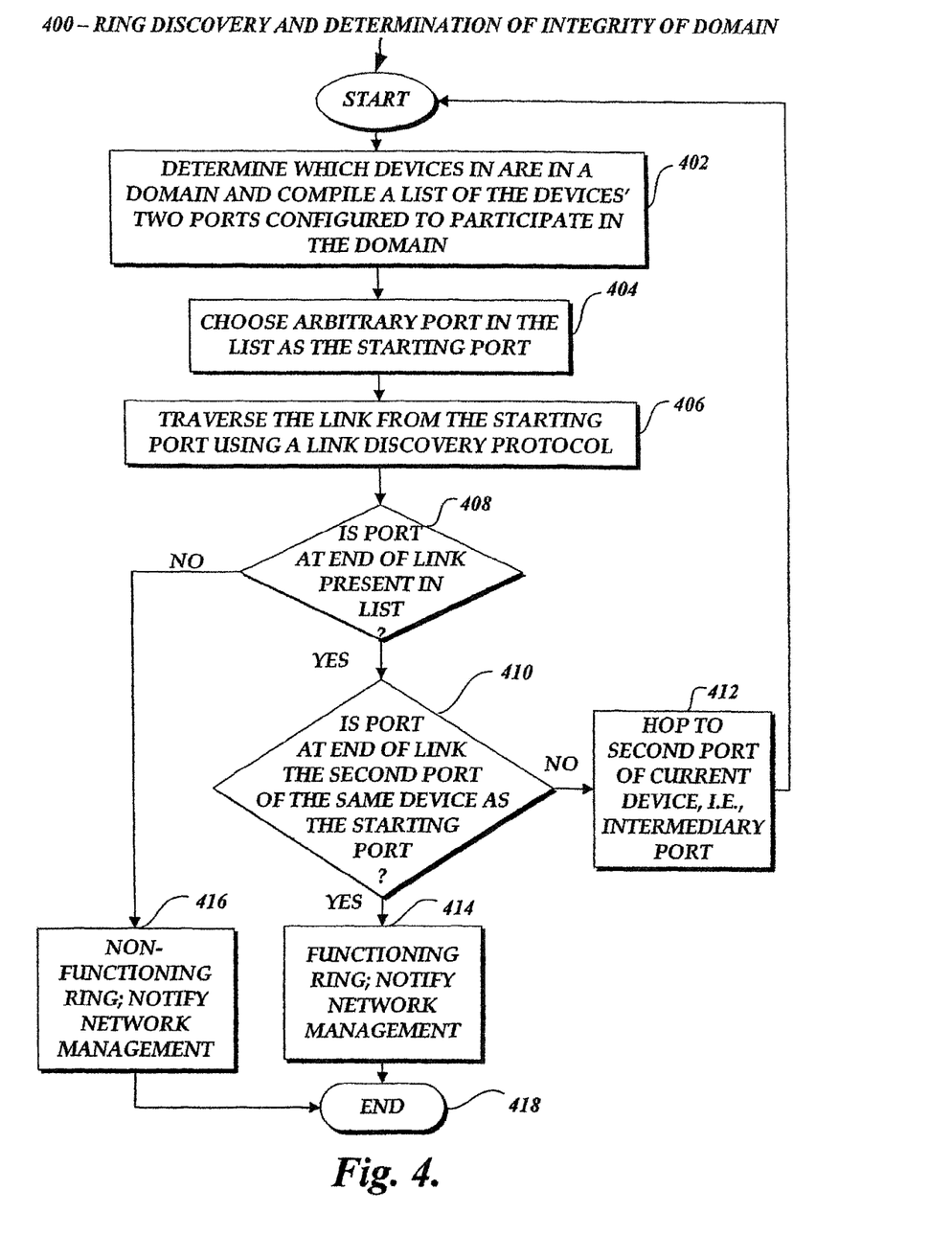
FIG. 4 illustrates a flow diagram of a method for discovering a conceptual ring topology such as those illustrated in FIGS. 2 and 3, in accordance with one embodiment of the present invention.

FIG. 4 illustrates a flow diagram of a ring discovery method 400 to be performed for discovering a conceptual ring topology such as those illustrated in FIGS. 2 and 3, in accordance with one embodiment of the present invention. In one embodiment, at block 402, typically in response to a request to discover a conceptual ring topology of an existing domain or domains, the ring discovery method 400 begins, for example, by determining which devices are in a domain, i.e., which devices have a protection protocol such as EAPS enabled, and compiling a list of the ports on those devices that are configured to participate in the domain, i.e., the two ports that have been added to the same control VLAN, with the same control VLAN tag, for the domain.

In a typical embodiment, at block 404, the method 400 continues by choosing an arbitrary starting node, i.e., a particular port on a device, also referred to as the starting port, from the list created at block 402. At block 406, the method 400 continues by traversing the link from the arbitrary starting node/starting port using a link discovery protocol, such as LLDP. At decision block 408, the method 400 determines whether the linked node, i.e., the node at the end of the link that was traversed using the link discovery protocol, also referred to as the ending port, is present in the list created at block 402. If not, the method 400 branches to block 416, notifies the requestor of the existence of a non-functioning ring, and terminates the discovery process at termination oval 418. However, if the linked node/ending port is present in the list created at block 402, then the method 400 continues at decision block 410 to further determine whether the linked node/ending port is the second port of the same device on which the discovery process was initiated, in which case the end of the conceptual ring has been reached.

In the illustrated embodiment, if the end of the conceptual ring has not been reached, then the method 400 continues at block 412 to hop to the second port of the current device on which the linked node resides, and branches back to block 406 to continue the discovery process using the second port of the current device as an intermediary port from which to discover the next link. However, if the linked node is, in fact, the second port of the same device on which the discovery process was initiated, then the end of the conceptual ring has been successfully reached. The method 400 continues at block 414 to notify the requestor of the existence of a functioning conceptual ring topology for the domain in question, and terminates the discovery process at termination oval 418.

It should be noted that discovering a complete conceptual ring, referred to herein as a functioning ring, does not guarantee that the ring will function as intended. For example, in the context of an EAPS protection domain, a functioning ring is an indication of a well-configured domain only as long as certain other conditions are met. Among the other conditions that must be met, the discovered links comprising the EAPS ring should properly include two ports of a single device designated as the primary and secondary ports of a master node of the EAPS domain, and two ports of each of the remaining devices designated as the respective two ring ports of the transit nodes of the EAPS domain. When these other conditions can be tested and appear to be met, then a notification may be generated to alert the network administrator, for example, that the conceptual ring topology associated with the domain is functioning and appears to be a well-configured EAPS domain. In some cases, however, the conditions may not be able to be tested, and the network administrator should first verify whether the other conditions have been met before concluding that the configuration of the domain is accurate.

Figure 5:
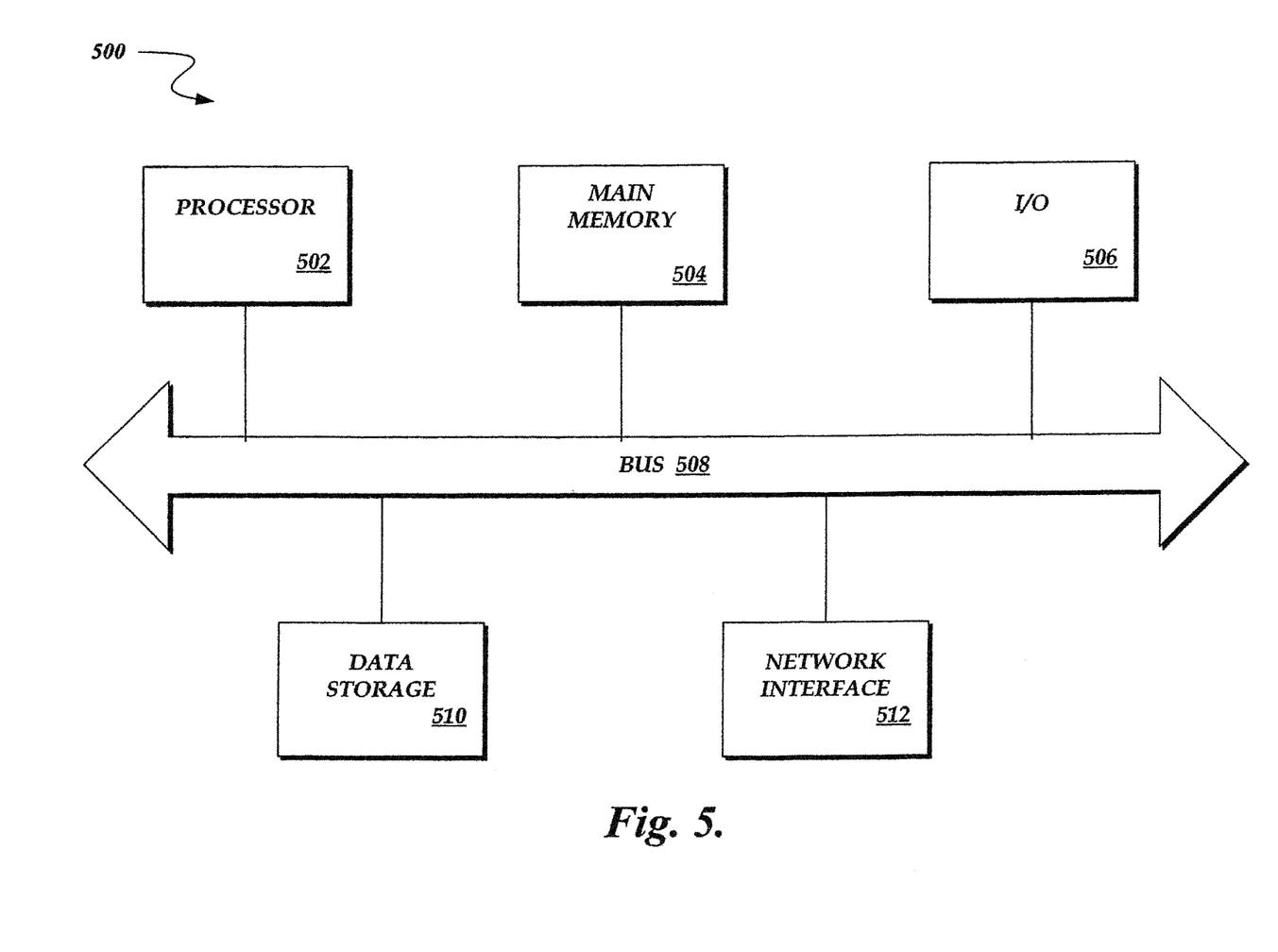
FIG. 5 illustrates one embodiment of a suitable computing environment in which certain aspects of the invention illustrated in FIGS. 1-4 may be practiced.

FIG. 5 illustrates one embodiment of a suitable computing environment in which certain aspects of the invention illustrated in FIGS. 1-4 may be practiced. In one embodiment, methods and apparatus for discovering a conceptual ring topology for preventing loops in a network in accordance with an embodiment of the invention may be implemented on a computer system 500 having components 502-512, including a processor 502, a memory 504, an Input/Output device 506 a data storage 510, and a network interface 512, coupled to each other via a bus 508. The components perform their conventional functions known in the art and provide the means for implementing the methods and apparatus for discovering a conceptual ring topology. Collectively, these components represent a broad category of hardware systems, including but not limited to general purpose computer systems, servers, switches and other specialized packet-forwarding devices.

In one embodiment, the memory component 504 may include one or more of random access memory (RAM), and nonvolatile storage devices (e.g., magnetic or optical disks) on which are stored instructions and data for use by processor 502, including the instructions and data that comprise the components of a method 400 for discovering a conceptual ring topology, including instructions comprising the method 400 and the data comprising the lists 202, 302, and any other instructions or data necessary for implementing the method. The data storage component 510 may also represent the instructions and data that comprise the components of a method 400 for discovering a conceptual ring topology, including instructions comprising the method 400 and the data comprising the lists 202, 302, and any other instructions or data necessary for implementing the method. In one embodiment, the network interface component 512 may include, for example, the device ports comprising the conceptual ring topology.

It is to be appreciated that various components of computer system 500 may be rearranged, and that certain implementations of the present invention may not require nor include all of the above components. Furthermore, additional components may be included in system 500, such as additional processors (e.g., a digital signal processor), storage devices, memories, network/communication interfaces, etc.

In the illustrated embodiment of FIG. 5, the method and apparatus for discovering a conceptual ring topology in accordance with one embodiment of the invention as discussed above may be implemented as a series of software routines executed by computer system 500. The software routines may comprise a plurality or series of instructions, code sequences, configuration information, or other data to be accessed and/or executed by a processing system such as one or more of processor 502. Initially, the series of instructions, code sequences, configuration information, or other data may be stored on a data storage 510 and transferred to memory 504 via bus 508. It is to be appreciated that the series of instructions, code sequences, configuration information, or other data can be stored a data storage 510 using any conventional computer-readable or machine-accessible storage medium, such as a diskette, CD-ROM, magnetic tape, DVD, ROM, etc.

It is also to be appreciated that the series of instructions, code sequences, configuration information, or other data need not be stored locally, and could be stored on a propagated data signal received from a remote storage device, such as a server on a network, via a network/communication interface 512. The instructions, code sequences, configuration information, or other data may be copied from the data storage 510, such as mass storage, or from the propagated data signal into a memory 504 and accessed and executed by processor 502.

In alternate embodiments, the present invention may be implemented in discrete hardware or firmware. For example, one or more application specific integrated circuits (ASICs) could be programmed with some or all of the above-described functions of the present invention.

Accordingly, a novel method and apparatus for discovering a conceptual ring topology for protected domains in a network is described. From the foregoing description, those skilled in the art will recognize that many other variations of the present invention are possible. In particular, while the present invention has been described as being implemented in a network environment comprising one or more EAPS domains 101 using a control VLAN 103, where the conceptual ring topologies of the EAPS domains are discovered using the facilities of an NMS 150, some of the discovery process logic for discovering the conceptual ring topologies may be distributed in other components of a network or inter-network application, and may be applied to other types of domains having a ring-shaped topology, other than EAPS domains 101. For example, the discovery process logic for discovering the conceptual ring topology may be applied to an STP domain. Thus, the present invention is not limited by the details described. Instead, the present invention can be practiced with modifications and alterations within the spirit and scope of the appended claims.

What is claimed is:

1. A method for discovering a conceptual ring topology of a protection domain in a network comprising:
   determining which devices are within a protection domain in a network, the protection domain protecting a group of one or more data carrying virtual local area networks (data VLANs) from unnecessary transmission of data within the data VLANs;
   identifying which ports on the devices are configured to participate in the protection domain;
   discovering links underlying the protection domain starting at an arbitrary one of the ports configured to participate in the protection domain; and
   determining whether a topology of the links underlying the protection domain form a ring, including:
      determining that each of the identified ports is accounted for in the discovered links after traversing all of the ports configured to participate in the domain in the devices within the domain.

2. The method of claim 1, wherein the protection domain prevents traffic from looping in the network, and further wherein the network is a ring network having multiple routes to a node in the ring network.

3. The method of claim 2, wherein determining which devices are within the protection domain is based on which devices in the ring network are enabled with a protocol to prevent traffic from looping.

4. The method of claim 3, wherein the protocol to prevent traffic from looping is the Ethernet Automatic Protection Switching protocol.

5. The method of claim 3, wherein the protocol to prevent traffic from looping is the Spanning Tree Protocol.

6. The method of claim 1, wherein identifying which ports on the devices are configured to participate in the domain includes identifying two ports added to a same control VLAN, with a same control VLAN tag, on a single device within the domain.

7. A system for determining the integrity of a protection domain in a ring network, the system comprising:
- a protection domain in a ring network, the protection domain protecting a group of one or more data carrying virtual local area networks (data VLANs) from unnecessary transmission of data within the data VLANs;
- a request to determine the integrity of the protection domain;
- a processor, in response to the request, to identify which devices in the ring network are within the protection domain and which ports on the devices are configured to participate in the protection domain, to discover a topology of the links underlying the protection domain, wherein to discover the topology is to determine that each of the identified ports is accounted for in the discovered links after traversing all of the ports configured to participate in the domain in the devices within the domain; and
- the processor further to compare the topology of the links to a port configuration of the ports configured to participate in the protection domain, wherein the topology matches the port configuration when the integrity of the protection domain is intact, and the topology does not match the port configuration when the integrity of the protection domain is not intact.

8. The system of claim 7, wherein the protection domain is an EAPS domain.

9. The system of claim 7, wherein the protection domain is an Spanning Tree Protocol domain.

10. The system of claim 7, wherein the request to determine the integrity of the protection domain is issued by a network management system for managing the ring network.

11. The system of claim 7, wherein to identify which devices in the ring network are within the protection domain is to identify devices in which a protection protocol is enabled.

12. The system of claim 7, wherein to identify which ports on the devices are configured to participate in the protection domain is to identify two ports added to a same control VLAN, with a same control VLAN tag, on a single device in the protection domain.

13. A non-transitory machine readable medium containing executable program instructions for causing a system to perform a method for discovering a conceptual ring topology of a protection domain in a network, the method comprising:
- determining which devices are within a protection domain in a network, the protection domain protecting a group of one or more data carrying virtual local area networks (data VLANs) from unnecessary transmission of data within the data VLANs;
- identifying which ports on the devices are configured to participate in the protection domain;
- discovering links underlying the protection domain starting at an arbitrary one of the ports configured to participate in the protection domain; and
- determining whether a topology of the links underlying the protection domain form a ring, including:
  - determining that each of the identified ports is accounted for in the discovered links after traversing all of the ports configured to participate in the domain in the devices within the domain.

14. The non-transitory machine readable medium of claim 13, wherein the protection domain prevents traffic from looping in the network, and further wherein the network is a ring network having multiple routes to a node in the ring network.

15. The non-transitory machine readable medium of claim 14, wherein determining which devices are within the protection domain is based on which devices in the ring network are enabled with a protocol to prevent traffic from looping.

16. The non-transitory machine readable medium of claim 15, wherein the protocol to prevent traffic from looping is the Ethernet Automatic Protection Switching protocol.

17. The non-transitory machine readable medium of claim 15, wherein the protocol to prevent traffic from looping is the Spanning Tree Protocol.

18. The non-transitory machine readable medium of claim 13, wherein identifying which ports on the devices are configured to participate in the domain includes identifying two ports added to a same control VLAN, with a same control VLAN tag, on a single device within the domain.

* * * * *